(12) United States Patent
Sugaya et al.

(10) Patent No.: US 6,665,668 B1
(45) Date of Patent: Dec. 16, 2003

(54) DOCUMENT RETRIEVAL METHOD AND SYSTEM AND COMPUTER READABLE STORAGE MEDIUM

(75) Inventors: Natsuko Sugaya, Kawasaki (JP); Katsumi Tada, Kawasaki (JP); Tadataka Matsubayashi, Yokohama (JP); Akihiko Yamaguchi, Yokohama (JP); Yasuhiko Inaba, Yokohama (JP); Yousuke Ushiroji, Osaka (JP)

(73) Assignee: Hitachi, Ltd., Tokyo (JP)

(*) Notice: Subject to any disclaimer, the term of this patent is extended or adjusted under 35 U.S.C. 154(b) by 158 days.

(21) Appl. No.: 09/645,561

(22) Filed: Aug. 24, 2000

(30) Foreign Application Priority Data

May 9, 2000 (JP) ........................................ 2000-142232

(51) Int. Cl.[7] .............................................. G06F 17/30
(52) U.S. Cl. .................................................. 707/6; 707/5
(58) Field of Search .............................. 707/1, 2, 3, 4, 707/5, 6, 101, 102; 345/589

(56) References Cited

U.S. PATENT DOCUMENTS

| | | | | |
|---|---|---|---|---|
| 5,926,808 A | * | 7/1999 | Evans et al. .................... | 707/1 |
| 6,026,409 A | * | 2/2000 | Blumenthal .................. | 345/589 |
| 6,289,353 B1 | * | 9/2001 | Hazlehurst et al. .......... | 707/101 |
| 6,353,823 B1 | * | 3/2002 | Kumar ........................ | 707/102 |

OTHER PUBLICATIONS

Donna Harman, "Ranking Algorithms", Information Retrieval, pp. 363–392.

* cited by examiner

Primary Examiner—Charles Rones
Assistant Examiner—Yicun Wu
(74) Attorney, Agent, or Firm—Antonelli, Terry, Stout & Kraus, LLP

(57) ABSTRACT

A document retrieval system is provided which has a document display interface which is easy to recognize the important portions even if a document retrieved by using a query expression designated by a document or a long sentence is displayed. When a text is registered, predetermined character strings and location information which are extracted from the text are stored in a location information file. A weight of each character string is calculated by a predetermined method and is stored in a weight file. In retrieving a document, predetermined character strings are extracted from a designated query expression. A similarity is calculated between the query expression and texts in the database by using the location information and the weights acquired from the location file and the weight file. In displaying the document, character strings having the high weights are extracted from the character strings used for the retrieval. Then, the display format of a portion which contains the extracted character strings is changed to display the text.

12 Claims, 15 Drawing Sheets

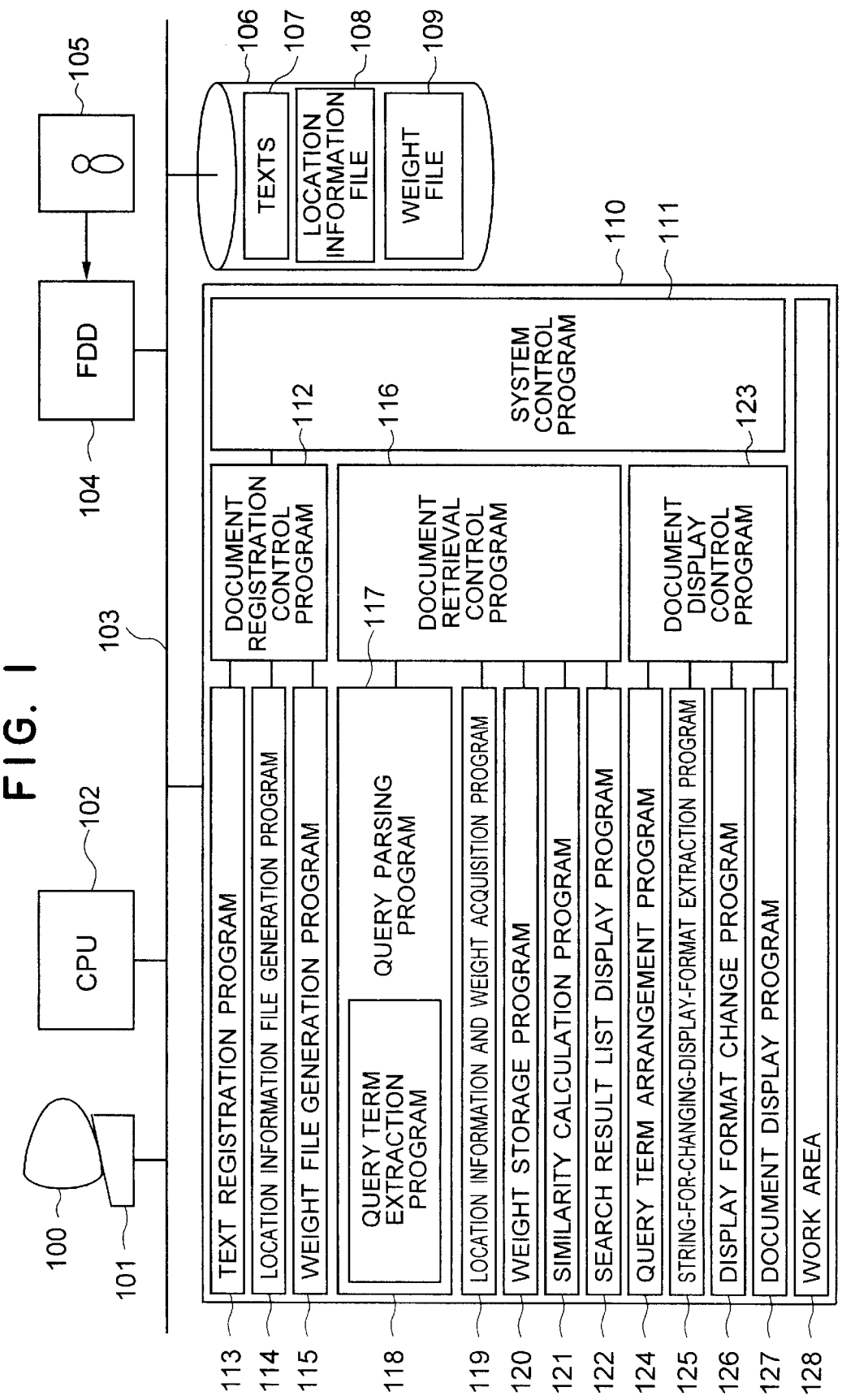

FIG. 2

WORDS IN DATABASE
(factors,information,help,human,operation,retrieval,systems)

QUERY EXPRESSION E :human factors in information retrieval systems (factors,information,help,human ,operation,retrieval,systems)

Q0=( 1 , 1 , 0 , 1 , 0 , 1 , 1 )

---

DOCUMENT 1: CONTAINS factors, information, human and retrieval
V1=(1,1,0,1,0,1,0)

DOCUMENT 2: CONTAINS factors, help, human and systems
V2=(1,0,1,1,0,0,1)

DOCUMENT 3: CONTAINS factors, operation and systems
V3=(1,0,0,0,1,0,1)

---

SIMPLE RANKING
Q0=(1,1,0,1,0,1,1)
V1=(1,1,0,1,0,1,1)
V1·Q0=(1,1,0,1,0,1,0)=4

Q0=(1,1,0,1,0,1,1)
V2=(1,0,1,1,0,0,1)
V2·Q0=(1,0,0,1,0,0,1)=3

Q0=(1,1,0,1,0,1,1)
V3=(1,0,0,0,1,0,1)
V3·Q0=(1,0,0,0,0,0,1)=2

RANKING USING WEIGHTS
Q0=(1,1,0,1,0,1,1)
V1=(2,3,0,5,0,3,0)
V1·Q0=(2,3,0,5,0,3,0)=13

QUERY EXPRESSIONY

Football match stadiums for W-Cup will be determined next month, selection right attributed to Association. The organizing arrangement committee for the 2002 football world cup under the joint auspices of Japan and Korea opened on 29th, a governor/mayor meeting is held by calling special directors from fifteen local self-governing bodies which are candidates for organizing the stadium. For the number of stadiums in Japan, Federation International de Football Association (FIFA)...

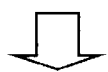 EXTRACTION OF WORD

QUERY TERM football, W-Cup, match, stadium, next, month, determined, selection, right, Association, Japan, Korea, joint, auspices, world, cup, organizing, arrangement, committee, place, candidates,...

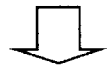 RETRIEVAL

SEARCH RESULT LIST

DOCUMENT 123    SCORE "100"
DOCUMENT 003    SCORE "95"
DOCUMENT 012    SCORE "70"
DOCUMENT 089    SCORE "60"
          :

 DOCUMENT DISPLAY

DOCUMENT 123

Reduction in the number of *W-Cup football stadiums* will be *determined next month*, *The organizing arrangement committee* for the *2002 football world cup (W-Cup)* announced, to the *local self-governing bodies* of *candidates, Federation Internationale de Football Association (FIFA)* draft that the number of *match stadiums* in this nation is reduced smaller than six to ten. Under the *joint auspices* of *Japan and Korea* ...

DOCUMENT 003

Yamagata Prefecture *arranged* to form a *football* team joining JFL. The *football association* of Yamagata Prefecture *determined* to form a *football* team joining JFL and an *arrangement* room will be opened *next month* .By attending at this *arrangement* room, invitation of investors for forming a *football* team, *selection* of *match stadiums* and the like are *arranged* . As the *candidates* of *stadiumses* ,....

FIG. 4

| CHARACTER STRINGING | WEIGHT |
|---|---|
| W-CUP | 80 |
| FOOTBALL | 80 |
| STADIUM | 50 |
| NEXT MONTH | 20 |
| DETERMINED | 50 |
| : | : |

⇒ ARRANGEMENT

| CHARACTER STRINGING | WEIGHT |
|---|---|
| W-CUP | 80 |
| FOOTBALL | 80 |
| WORLD CUP | 70 |
| FIFA | 60 |
| STADIUM | 50 |
| : | : |

EXTRACT UPPER m (m=4) CHARACTER STRINGS ⇩

| CHARACTER STRINGING | WEIGHT |
|---|---|
| W-CUP | 80 |
| FOOTBALL | 80 |
| WORLD CUP | 70 |
| FIFA | 60 |

DOCUMENT DISPLAY ⇩

DOCUMENT "123"

Reduction in the number of W-Cup football stadiums will be determined next month.
The organizing arrangement committee for the 2002 football world cup (W-Cup) announced, to the local self-governing bodies of stadiums candidates, Federation Internationale de football Association (FIFA) draft that the number of match stadiums in this nation is reduced smaller than six to ten.
Under the joint auspices of Japan and Korea....

DOCUMENT "003"

Yamagata Prefecture arranged to form a football team joining JFA. The football association of Yamagata Prefecture determined to form a football team joining JFL and a arrangement room will be opened last month. By attending at this arrangement room, invitation of investors for forming a football team, selection of match stadiums and the like are arranged. As the candidates of stadiums,...

FIG. 8

DOCUMENT TO BE REGISTERED

| | |
|---|---|
| DOCUMENT 1 | The number of football stadiums for the W- Cup, will be determined next month - according to the executive director of the football association.The W-Cup.... |
| DOCUMENT 2 | Deregulation to free start of bank branch offices, will be officially determined next month. .... |
| DOCUMENT 3 | Collective disaster prevention training, will be made next month at the Gotenba Place. .... |

STORE LOCATION INFORMATION        STORE WEIGHT

| CHARACTER STRING | DOCUMENT NO. | NUMBER OF LOCATION |
|---|---|---|
| W-CUP | 1 | 2 |
| FOOTBALL | 1 | 3 |
| STADIUM | 1 | 1 |
| | 3 | 2 |
| NEXT MONTH | 1 | 1 |
| | 2 | 1 |
| | 3 | 2 |
| DETERMINED | 1 | 2 |
| | 2 | 1 |
| : | : | : |

LOCATION INFORMATION FILE — 108

| CHARACTER STRING | WEIGHT |
|---|---|
| W-CUP | 80 |
| FOOTBALL | 80 |
| STADIUM | 50 |
| NEXT MONTH | 20 |
| DETERMINED | 50 |
| : | : |

WEIGHT FILE
109

FIG. 12

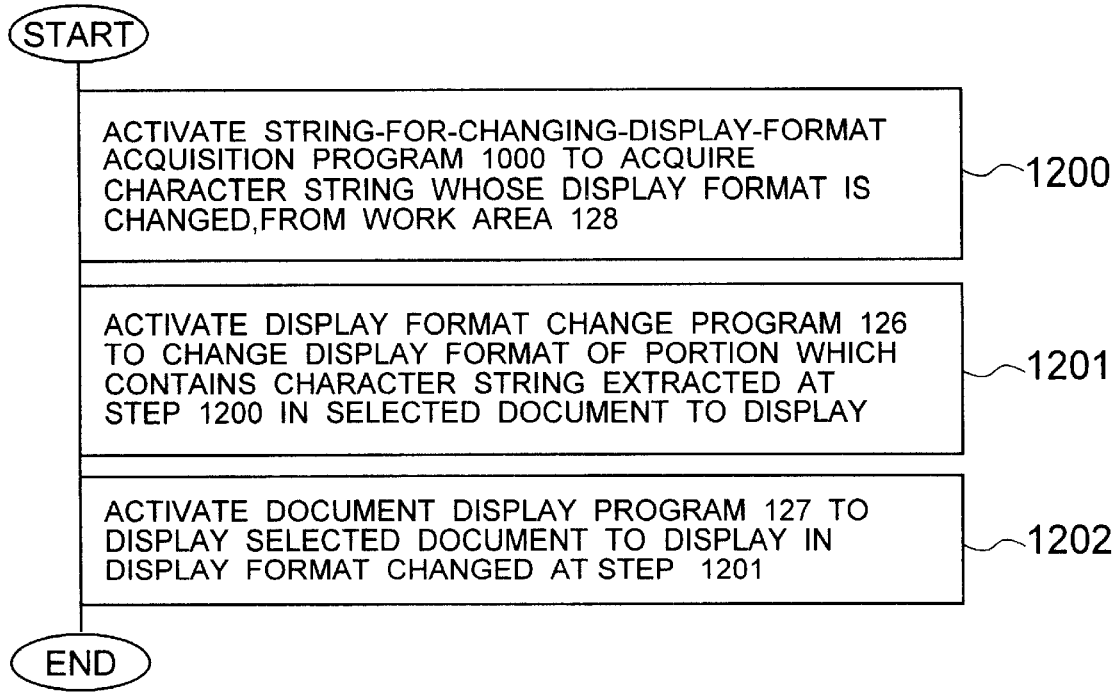

START

ACTIVATE STRING-FOR-CHANGING-DISPLAY-FORMAT ACQUISITION PROGRAM 1000 TO ACQUIRE CHARACTER STRING WHOSE DISPLAY FORMAT IS CHANGED, FROM WORK AREA 128 — 1200

ACTIVATE DISPLAY FORMAT CHANGE PROGRAM 126 TO CHANGE DISPLAY FORMAT OF PORTION WHICH CONTAINS CHARACTER STRING EXTRACTED AT STEP 1200 IN SELECTED DOCUMENT TO DISPLAY — 1201

ACTIVATE DOCUMENT DISPLAY PROGRAM 127 TO DISPLAY SELECTED DOCUMENT TO DISPLAY IN DISPLAY FORMAT CHANGED AT STEP 1201 — 1202

END

FIG. 13

SCREEN FOR QUERY TERM EDITING AND SELECTED-STRING-TO-HIGHLIGHT SELECTION

EXECUTE RETRIEVAL    ADD CHARACTER STRING

| FOR DISPLAY | FOR RETRIEVAL | |
|---|---|---|
| ☒ | ☒ | FOOTBALL |
| ☒ | ☒ | W-CUP |
| ☐ | ☒ | MATCH |
| ☒ | ☒ | STADIUM |
| ☐ | ☐ | NEXT MONTH |
| ☐ | ☒ | DETERMINED |
| ☐ | ☒ | SELECTION |
| ☐ | ☐ | RIGHT |
| ☐ | ☒ | ASSOCIATION |
| ☐ | ☐ | JAPAN |
| ☐ | ☐ | KOREA |
| ☐ | ☐ | JOINT AUSPICES |
| ☒ | ☒ | WORLD CUP |
| | | ... |

FIG. 14

ACQUIRED CHARACTER STRINGS

| FOOTBALL |
| W-CUP |
| STADIUM |
| WORLD CUP |

DOCUMENT DISPLAY 

DOCUMENT "123"

> Reduction in the number of W-Cup football stadiums will be determined next month.
> The organizing arrangement committee for the 2002 football world cup (W-Cup) announced, to the local self-governing bodies of stadiums candidates, Federation Internationale de Football Association (FIFA) draft that the number of match stadiums in this nation is smaller than six to ten.
> Under the joint auspices of Japan and Korea....

DOCUMENT "003"

> Yamagata Prefecture arranged to form a football I team joining JFL. The football association of Yamagata Prefecture determined to form a football team joining JFL and a arrangement room will be opened last month. By attending at this arrangement room, invitation of investors for forming a football team, selection of match stadiums and the like are arranged. As the candidates of stadiums ,....

FIG. 15

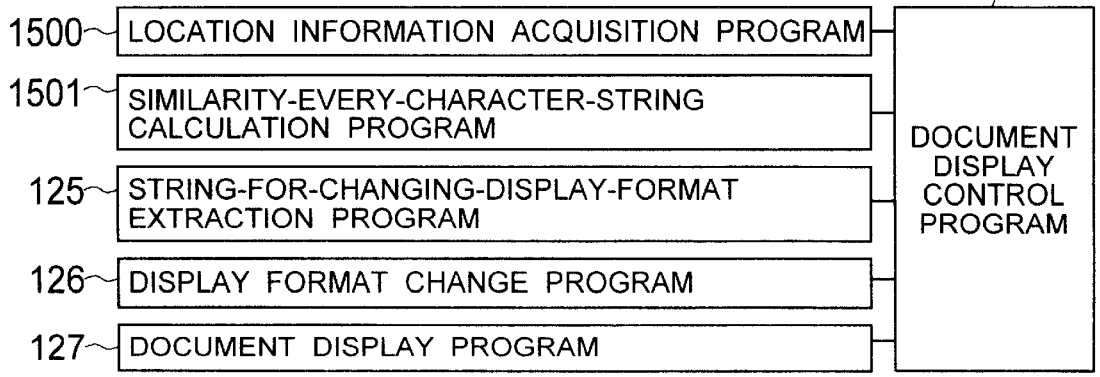

FIG. 17

| CHARACTER STRING | WEIGHT |
|---|---|
| W-CUP | 80 |
| FOOTBALL | 80 |
| STADIUM | 50 |
| NEXT MONTH | 20 |
| DETERMINED | 50 |
| : | : |

DOCUMENT "123"   SCAN

Reduction in the number of W-Cup football stadiums will be determined next month.
The organizing arrangement committee for the 2002 football world cup (W-Cup) announced, to the local self-governing bodies of stadiums candidates an Internationale de Football Association (FIFA) draft that the number of match stadiums in this nation is reduced smaller than six to ten.
Under the joint auspices of Japan and Korea....

ACQUIRE LOCATION INFORMATION  

| CHARACTER STRING | WEIGHT | NUMBER OF LOCATION |
|---|---|---|
| W-CUP | 80 | 5 |
| FOOTBALL | 80 | 8 |
| STADIUM | 50 | 3 |
| NEXT MONTH | 20 | 1 |
| DETERMINED | 50 | 1 |
| : | : | : |

CALCULATE CONTRIBUTION FACTOR AND ARRANGE  

| CHARACTER STRING | CONTRIBUTION FACTOR |
|---|---|
| FOOTBALL | 40 |
| W-CUP | 25 |
| STADIUM | 10 |
| ORGANIZING | 5 |
| DETERMINED | 3 |
| : | : |

FIG. 18

| CHARACTER STRING | CONTRIBUTION FACTOR |
|---|---|
| FOOTBALL | 40 |
| W-CUP | 25 |
| STADIUM | 10 |
| ORGANIZING | 5 |
| DETERMINED | 3 |
| : | : |

EXTRACT UPPER m (m=3) CHARACTER STRINGS ⇨

| CHARACTER STRING | CONTRIBUTION FACTOR |
|---|---|
| FOOTBALL | 40 |
| W-CUP | 25 |
| STADIUM | 10 |

DOCUMENT DISPLAY ⇩

DOCUMENT "123"

Reduction in the number of W-Cup football stadiums will be determined next month.
The organizing arrangement committee for the 2002 football world cup (W-Cup) announced, to the local self-governing bodies of stadiums candidates, Federation Internationale de football Association (FIFA) draft that the number of match stadiums in this nation is reduced smaller than six to ten. Under the joint auspices of Japan and Korea....

| CHARACTER STRING | CONTRIBUTION FACTOR |
|---|---|
| FOOTBALL | 70 |
| ARRANGEMENT | 10 |
| NEXT MONTH | 8 |
| STADIUM | 5 |
| MATCH | 3 |
| : | : |

EXTRACT UPPER m (m=3) CHARACTER STRINGS ⇨

| CHARACTER STRING | CONTRIBUTION FACTOR |
|---|---|
| FOOTBALL | 70 |
| ARRANGEMENT | 10 |
| NEXT MONTH | 8 |

DOCUMENT DISPLAY ⇩

DOCUMENT "003"

Yamagata Prefecture arranged to form a football team joining JFL. The football association of Yamagata Prefecture determined to form a football team joining JFA and a arrangement room will be opened next month. By attending at this arrangement room, invitation of investors for forming a football team, selection of match stadiums and the like are arranged. As the candidates of stadiums,....

DOCUMENT RETRIEVAL METHOD AND SYSTEM AND COMPUTER READABLE STORAGE MEDIUM

BACKGROUND OF THE INVENTION

1. Field of the Invention

The present invention relates to document retrieval techniques for retrieving a registered document in accordance with an input query expression and displaying information of the retrieved document.

2. Description of the Related Art

In recent years, the number of electronic documents formed by a word processor and the like is increasing, and it is expected that the number of such documents increases in the future. A database used for the document retrieval is also becoming large in scale. Therefore, the set of documents, which is a search result obtained by the document retrieval is also becoming large. It is difficult for a user to find a really desired document from them.

In order to solve this problem, there is a ranking technique as the related art. The ranking technique is specifically described in "Ranking Algorithms", by Donna Harman, Information Retrieval, pp. 363–392. This technique is hereinafter called "Related Art 1". Related Art 1 provides a technique of calculating a factor which shows the possibility of being similar to the contents of a query expression (sentence, document, or a sequence of words) designated by the user. An example of the contents will be described with reference to FIG. 2.

A retrieval (or search) is realized by a simple vector operation. Each element of this vector corresponds to words after excluding the overlapped words from all words appearing in the database (however, stop words and the like are excluded). In the example shown in FIG. 2, the elements are constituted of (factors, information, help, human, operation, retrieval, systems). "1" is set at the corresponding position if the query expression contains the element, and "0" is set at the corresponding position if the query expression does not contain the element. In this manner, vector Q0 of the query expression can be formed. That is, vector Q0 (1, 1, 0, 1, 0, 1, 1) is formed for query expression "human factors in information retrieval systems".

A vector of document is similarly formed for each document in the database. Vector V1 (1, 1, 0, 1, 0, 1, 0) is formed for Document 1 containing "factors", "information", "human" and "retrieval". Vector V2 (1, 0, 1, 1, 0, 0, 1) is formed for Document 2 containing "factors", "help", "human" and "systems". Vector V3 (1, 0, 0, 0, 1, 0, 1) is formed for Document 3 containing "factors", "operation" and "systems".

A score used for ranking is calculated from vector operation Vi·Q0 between vector Q0 of the query expression and vector Vi (i=1, 2, 3) of each document. The calculation results are score "4" for Document 1, score "3" for Document 2, and score "2" for Document 3. Each score represents the similarity to the query expression judged by the system. The document having the higher score has the higher possibility of being similar to the contents of the query expression.

Instead of expressing the element of the vector as "1" or "0", the element may be expressed by the weight of word (calculated from the location frequency of the word, the location deviation of the word in the document database, or the like). For example, if the weight of "factors" is "2", the weight of "information" is "3", the weight of "human" is "5" and the weight of "retrieval" is "3", then vector V'1 (2, 3, 0, 5, 0, 3, 0) can be formed for Document 1. Similarly, if the weight of "factors" is "2", the weight of "help" is "4", the weight of "human" is "5" and the weight of "systems" is "1", then vector V'2 (2, 0, 4, 5, 0, 0, 1) can be formed for Document 2. Furthermore, if the weight of "factors" is "2", the weight of "operation" is "2" and the weight of "system" is "1", then vector V'3 (2, 0, 0, 0, 2, 0, 1) can be formed for Document 3.

The score of each document can be calculated from vector operation V'1·Q0 between vector V'1 and query expression vector Q0. The calculation results are score "13" for Document 1, score "8" for Document 2 and score "3" for Document 3. Each score represents the similarity to the query expression, which is judged by the system in consideration of the weight of word, i.e., the importance degree of word. The document having the higher score has the higher possibility of being similar to the contents of the query expression. That is, the search result shows that Document 1 has the highest possibility of being similar to the contents of the query expression.

In Related Art 1, the factor which shows the possibility of being similar to the contents of the query expression is calculated. By browsing the documents in accordance with this factor, the desired document can be searched at high speed from the large-scale document database. However, whether or not the search result document is really the desired document is judged by the user by actually reading the contents of the document. As the technique of supporting the instant judgement of whether or not the document obtained as the search result is really the desired document, there is the document highlighting technology which is hereinafter called "Related Art 2".

In Related Art 2, when the contents of the document obtained as the search result is displayed, a portion containing a character string of the query expression designated by the user is displayed in a display format (hereinafter called "a highlight") different from that of other character string portions. The display format includes color, size, font, style (bold or roman) and the like. By displaying the portion containing the character string of the query expression in the display format different from that of other character string portions, it is possible to recognize at once the position containing the word. As a result, whether or not the document is the desired document can be judged faster than reading the document from the start thereof.

A word is often used as the element of the vector used by the ranking technique of Related Art 1. In a language such as English language in which each word is written in a delimiting manner, all words excepting stop words (such as "in" and "the") are used as the vector elements. In a language such as Japanese language in which each word is not written in a delimiting manner, a character string obtained by dividing the different character types, consecutive n characters ("n" is a predetermined integer of "1" or larger), a word derived with reference to a dictionary or the like, and so forth are used as the vector elements. As a result, if a document or a long sentence is designated as the query expression-to execute the retrieval and the document obtained as the search result is displayed in accordance with the highlighting technology shown in Related Art 2, the number of character strings to be highlighted becomes large. Thereby, there is a problem that the important portion becomes difficult to be found.

This problem will be described with reference to FIG. 3 by taking a newspaper article database as an example. In this example, a newspaper article document regarding the stadium invitation for world cup of football is designated as the query expression to execute the retrieval.

First, character strings used for the retrieval are extracted from document "Football match stadiums for W-Cup will be determined next month, selection right attributed to Association. The organizing arrangement committee for the 2002 football world cup under the joint auspices of Japan and Korea opened on 29th, a governor/mayor meeting is held by calling special directors from fifteen local self-governing bodies which are candidates for organizing the stadium. For the number of stadiums in Japan, Federation International de Football Association (FIFA) . . . " which is designated as the query expression. In the example shown in FIG. 3, nouns, katakana characters and gerunds, which are extracted by referring to a dictionary and the like, are extracted as the character string used for the retrieval. As a result, "football, W-Cup, match, stadium, next, month, determined, selection, right, Association, Japan, Korea, joint, auspices, world, cup, organizing, arrangement, committee, place, candidates, . . . " are extracted from the search expression. By using these character strings, the document retrieval is executed. The factors which shows the possibility of being similar to the contents of the query expression are calculated and output together with a list of the documents. In this state, the user browses the documents staring from the document which has the highest possibility of being similar to the contents of the query expression, i.e., the document having the highest score, and confirms whether or not the document is the really desired document. If the highlighting technology such as Related Art 2 is incorporated, the position containing the character string of the query expression can be confirmed at once, so that whether or not the document is the desired document can be judged faster than reading the document from the start thereof. However, as shown in FIG. 3, if the document or the long sentence is designated to execute the retrieval and the documents obtained as the result are displayed, since the number of character strings used for the retrieval is large, there is a large number of highlighted portions (in the example shown in FIG. 3, large font sizes, roman type, and emphasis). It becomes therefore rather difficult to find the important portions.

SUMMARY OF THE INVENTION

It is an object of the invention to realize a document information display function which allows a user to easily judge whether or not a retrieved document is a desired document.

In order to solve the above-described problems, the invention comprises the following steps.

That is, it comprises: a document retrieval step of calculating as a similarity by a predetermined calculation method a degree of similarity between contents of a query expression designated by a user and contents of a text in a text database storing document information as character code data; and a document display step of selecting important information from information used for calculating the similarity in the document retrieval step to display the selected important information.

The principle of the present invention using the above-mentioned document retrieval method will be described in the following. When a user designates a sentence or a document as the query expression in retrieving a document, the document retrieval step mentioned above is executed to calculate the similarity by the predetermined calculation method. Here, the similarity is defined as the degree of similarity between the contents of the query expression designated by the user and the contents of each text in the text database. An example of the process contents of the document retrieval step will be described. First, the predetermined character strings are extracted from the designated query expression (hereinafter called "a query expression document"). As this character strings, words are used for a language such as English language in which each word is written in a delimiting manner, and for other languages, character strings obtained by dividing the different character types, consecutive character string consisting of n characters ("n" is the predetermined integer of 1 or larger), words derived with reference to a dictionary and the like, and so forth are used. If query expression document "Football match stadiums for W-Cup will be determined next month, selection right attributed to Association. The organizing arrangement committee for the 2002 football world cup under the joint auspices of Japan and Korea opened on 29th, a governor/mayor meeting by calling special directors from fifteen local self-governing bodies which are candidates for organizing the stadium. For the number of stadiums in Japan, Federation International de Football Association (FIFA) . . . " is designated, and if nouns, katakana characters and gerunds are extracted as the character strings by referring to a dictionary and the like, then as shown in FIG. 3, "football, W-Cup, match, stadium, next, month, determined, selection, right, Association, Japan, Korea, joint, auspices, world, cup, organizing, arrangement, committee, place, candidates, . . . " is extracted. The location information of these character strings in the text database is extracted. Although the location information changes with the retrieval method to be used, the serial number of the document which the character strings appears, the position of each location, the number of locations and the like are used. In Related Art 1, the serial number of the document which contains the character strings necessary for forming the vector of the document and the number of locations thereof are used. Next, the weight of each character string is calculated from this location information by using the predetermined calculation method. Although the calculation method changes with the retrieval method to be used, this weight is calculated by using the location frequency of each character string, the location deviation of each character string in the document database or the like. The weight calculated from the location deviation is generally an IDF (Inverse Document Frequency) described in "Ranking Algorithms" by Donna Harman, Information Retrieval, pp.363–392. The IDF is the weight which is proposed based on the concept that there is the high possibility that the character string contained in many documents is the stop word and has the low importance degree. The similarity is calculated in the predetermined calculation method using the location information and the weight. Although the calculation method changes with the retrieval method to be used, the simple vector operation used in Related Art 1 illustrated in FIG. 2 may be used for this calculation. The calculated similarities are displayed as the search result list.

In response to the display request of the document selected in the search result list, the document display step mentioned above is executed to select the important information from the information used for calculating the similarity in the document retrieval step and display the selected important information. An example of the process contents of the document display step will be described. First, the character strings and their weights extracted from the query expression in the document retrieval step are arranged in the descending order of the weight. The upper m ("m" is a predetermined integer of 1 or larger) character strings of the arranged character strings are extracted. The value of "m" may be automatically set to the proper value by the system itself, or may be set by the user beforehand. Alternatively, the user may set and adjust the value to the appropriate value interactively every document display. An example of the extracted character strings is shown in FIG. 4. In the example shown in FIG. 4, "m" is set to "4". The upper four character strings arranged in the descending order of the weight are extracted. As a result, "W-Cup", "football", "world cup" and "FIFA" are extracted. Next, the display format of the portion containing the extracted character string in the document designated to be displayed by the user (hereinafter called "a selected document to display") is changed, and the selected document to display is displayed. As shown in FIG. 4, the display format of the portions containing the extracted "W-Cup", "football", "world cup" and "FIFA" is changed (in the example shown in FIG. 4, in the large size, roman bold fonts), and the document is displayed. The user can therefore confirm the important portions in the document at once. In this process example, the important information mentioned above means the highlighting information on the important character strings, and the important character string means the upper m ("m" is a predetermined integer of 1 or larger) character strings of the character strings arranged in the descending order of the weight.

As described above, in this method, the character strings which affect the factor which shows the possibility of being similar to the contents of the query expression, e.g., the predetermined number of character strings as counted from the highest weight are selected. As the information on these character strings, the document is displayed after changing the display format of the portions containing the character strings. As a result, since only the information on the important character strings of the character strings used for the retrieval is displayed, the user can confirm the important portions in the document at once, and can quickly judge whether or not the document is the desired document. Therefore, the quality of the user interface for browsing the search result document can be improved.

A program realizing the above-described function or a storage medium storing such a program may be used in order to achieve the above-described object.

BRIEF DESCRIPTION OF THE DRAWINGS

FIG. 1 is a diagram showing the structure of a first embodiment of the invention.

FIG. 2 is a diagram illustrating the process contents in Related Art 1.

FIG. 3 is a diagram illustrating a problem associated with Related Art 2.

FIG. 4 is a diagram illustrating the contents of a document display process of the invention.

FIG. 8 is a diagram illustrating an example of forming a location information file 108 and a weight file 109.

FIG. 12 is a PAD showing the process contents of the document display control program 123*a*.

FIG. 13 is a diagram showing an example of a screen displaying the query term editing and the selection of the selected string to highlight.

FIG. 14 is a diagram illustrating the contents of a document display process in the second embodiment of the invention.

FIG. 15 is a diagram illustrating the contents of programs under the control of a document display control program 123*b* in a third embodiment of the invention.

FIG. 17 is a diagram illustrating the contents of a location information acquiring process and a similarity-every-character-string calculating process in the third embodiment of the invention.

FIG. 18 is a diagram illustrating the contents of a display format change and character string extracting process, a display format changing process, and a document display process in the third embodiment of the invention.

DETAILED DESCRIPTION OF THE EMBODIMENTS

Figure 5:
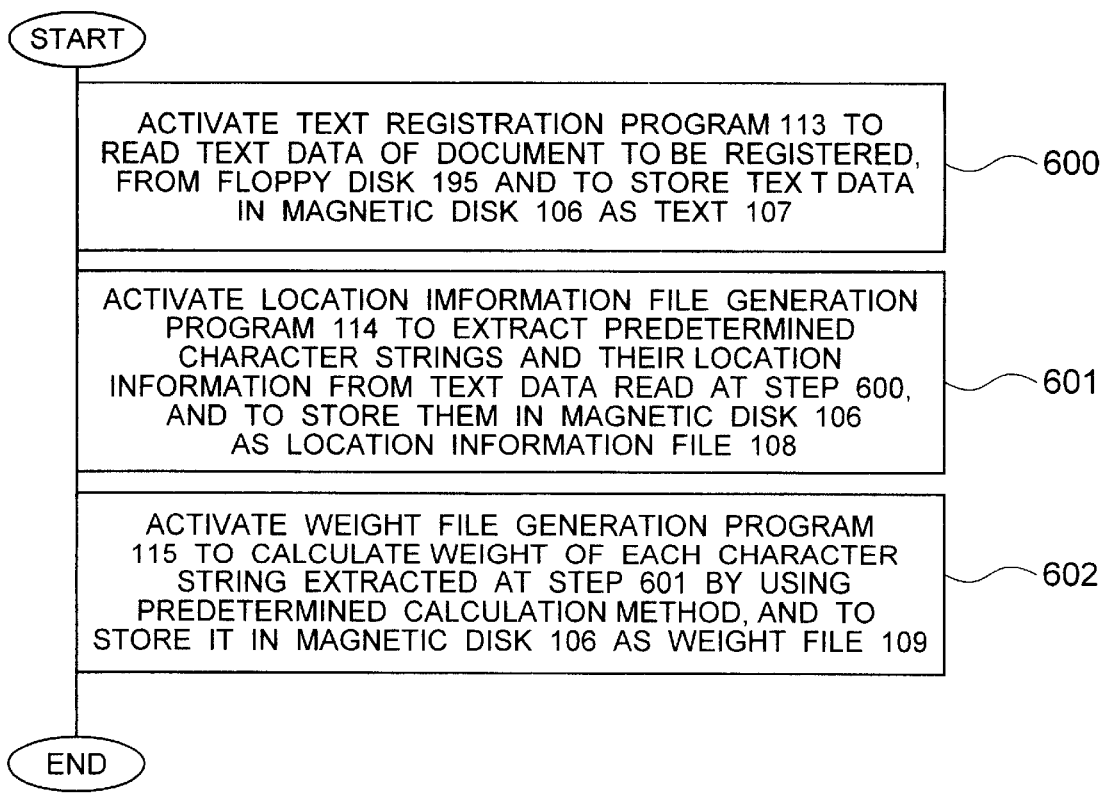
FIG. 5 is a problem analysis diagram (PAD) showing the process contents of a document registration control program 112.

A first embodiment of the invention will be described with reference to FIG. 1.

A document retrieval system of the invention has a display 100, a keyboard 101, a central processing unit (CPU) 102, a magnetic disk drive 106, a floppy disk drive (FDD) 104, a main memory 110 and a bus 103 interconnecting these units. The magnetic disk drive 106 is one of the secondary storage units and stores texts 107, a location information file 108 and a weight file 109. Information stored in a floppy disk 105 can be accessed from the FDD 104.

The main memory 110 stores a system control program 111, a document registration control program 112, a text registration program 113, a location information file generation program 114, a weight file generation program 115, a document retrieval control program 116, a query parsing program 117, a location information and weight acquisition program 119, a weight storage program 120, a similarity calculation program 121, a search result list display program 122, a document display control program 123, a query term arrangement program 124, a string-for-changing-display-format extraction program 125, a display format change program 126 and a document display program 127, and retains a work area 128. A query term extraction program 118 is contained in the query parsing program 117. These programs may be stored in a computer readable storage medium such as the magnetic disk 106 and the floppy disk 105.

The system control program 111 is activated in response to a command from the keyboard 101. The document registration control program 112 is activated by the system contort program 111 in response to a document registration command from the keyboard 101, and controls the text registration program 113, the location information file generation program 114 and the weight file generation program 115. The document retrieval control program 116 is activated by the system contort program 111 in response to a document retrieval command from the keyboard 101, and controls the query parsing program 117, the location information and weight acquisition program 119, the weight storage program 120, the similarity calculation program 121 and the search result list display program 122. The document display control program 123 is activated by the system contort program 111 in response to a document display command from the keyboard 101, and controls the query term arrangement program 124, the string-for-changing-display-format extraction program 125, the display format change program 126 and the document display program 127.

Next, the summary of the process contents of the embodiment will be described.

In registering a document, in response to the document registration command from the keyboard 101, the system control program 111 activates the document registration control program 112. The document registration control program 112 executes a series of document registration processes by using the text registration program 113, the location information file generation program 114 and the file generation program 115. The document registration process contents, i.e., the process contents of the document registration program 112 are illustrated in a PAD (Problem Analysis Diagram) of FIG. 5. As shown in FIG. 5, at Step 600, the document registration control program 112 activates the text registration program 113 to read the text data of a document to be registered, from the floppy disk 105 inserted into the FDD 104, and to store the read text data as a text 107 in the magnetic disk 106. The text data may be input not only from the floppy disk 105 but also from another system by using a communication line and a CD-ROM (not shown in FIG. 1). Next, at Step 601, the location information file generation program 114 is activated to extract the predetermined character strings and their location information from the text data read at Step 600, and to store the extracted character strings and their location information in the magnetic disk 106 as the location information file 108. As the character strings to be extracted, words are used for a language such as English language in which each word is written in a delimiting manner, and for other languages, character strings obtained by dividing the different character types, consecutive n characters ("n" is a predetermined integer of 1 or larger), words derived with reference to a dictionary and the like, and so forth are used. Although the location information changes with the retrieval method to be used, the location information necessary for the retrieval includes the serial number of the document which contains the character strings, the position of each location thereof, the number of locations thereof and the like. In Related Art 1, the serial number of the document which contains the character strings necessary for forming a vector of a document and the number of locations thereof are used. Lastly, at Step 602, the weight file generation program 115 is activated to calculate the weight of each character string extracted at Step 601 by using a predetermined calculation method, and to store it in the magnetic disk 106 as the weight file 109. Although the calculation method changes with the retrieval method to be used, this weight is calculated by using the location frequency of each character string, the location deviation of each character string in the document database, or the like (generally by using the IDF (Inverted Document Frequency) described in "Ranking Algorithms" by Donna Harman, Information Retrieval, pp. 363–392). Thereafter, the document registration process is terminated.

In retrieving a document, the system control program 111 activates the document retrieval control program 116 in response to the document retrieval command from the keyboard 101. The document retrieval control program 116 controls a series of the document retrieval processes by using the query parsing program 117, the location information and weight acquisition program 119, the weight storage program 120, the similarity calculation program 121, and the search result list display program 122.

For a preparatory process of the document retrieval, the document retrieval control program 116 reads the location information file 108 and the weight file 109 which are stored in the magnetic disk 106, into the work area 128 reserved in the main memory 110. In the document retrieval process, as shown in a PAD of FIG. 6, at Step 700, the query parsing program 117 is activated to parse the query expression entered from the keyboard 101. If it is judged at Step 701 that a sentence or document is designated as the entered query expression, then at Step 702, the predetermined character strings are extracted from the sentence or document designated as the query expression, by using the query term extraction program 118. As this character string, words are used for a language such as English language in which each word is written in a delimiting manner, and for other languages, character strings obtained by dividing the different character types, consecutive n characters ("n" is a predetermined integer of 1 or larger), words derived with reference to a dictionary and the like, and so forth are used, as well as the character string extracted by the document registration process by the document registration program 112. If it is judged at Step 701 that a sequence of words is designated as the entered query expression, then at Step 703, this sequence of words is extracted from the entered query expression. Next, at Step 704, the location information and weight acquisition program 119 is activated to acquire the location information and the weight of each character string (or word) extracted from the query expression, from the location information file 108 and weight file 109 read in the work area 128. The acquired character string and weight are stored in the work area 128 by activating the weight storage program 120 at Step 705.

Next, at Step 706, the similarity calculation program 121 is activated to calculate the similarity between the query expression and the text data by using the location information and the weight of each character string acquired at Step 704 and by using the predetermined calculation method. Although this calculation method changes with the retrieval method to be used, the simple vector operation used in Related Art 1 may be used for this calculation. Lastly, at Step 707, the search result list display program 122 is activated to arrange the text data in the descending order of the similarity calculated at Step 706, and to display it as the search result list. Thereafter, the document retrieval process is terminated.

Figure 7:
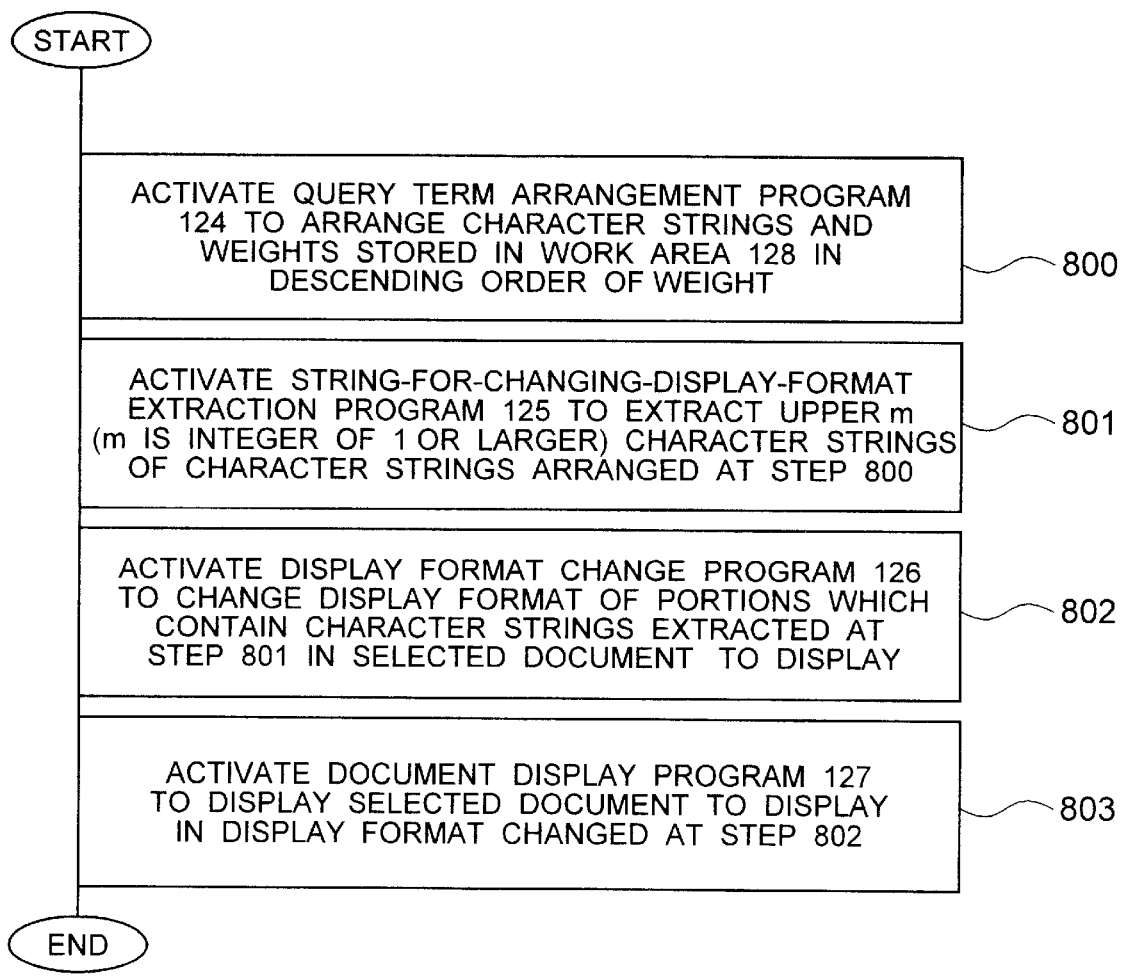
FIG. 7 is a PAD showing the process contents of a document display control program 123.

In displaying the document, the system control program 111 activates the document display control program 123 in response to the document display command from the keyboard 101. The document display control program 123 controls a series of document display processes by using the query term arrangement program 124, the string-for-changing-display-format extraction program 125, the display format change program 126, and the document display program 127. The process contents of the document display process are illustrated in a PAD of FIG. 7. As shown in FIG. 7, at Step 800, the query term arrangement program 124 is activated to arrange the character strings and their weights, which are stored in the work area 128 by the document retrieval process of the document retrieval control program 116, in the descending order of the weight. Next, at Step 801, the string-for-changing-display-format extraction program 125 is activated to extract the upper m ("m" is a predetermined integer of 1 or larger) character strings of the character strings arranged at Step 800. The value of "m" may be automatically set to a proper value by the system itself, or may be set by the user beforehand. Alternatively, the user may set and adjust the value to the proper value interactively each time the document is displayed. Next, at Step 802, the display format change program 126 is activated to change the display format of portions which contain the character strings extracted at Step 801 in the document designated to be displayed (hereinafter called "a selected document to display"). The method of changing the display format is same as Related Art 2. Lastly, at Step 803, the document display program 127 is activated to display the selected document to display in the display format changed at Step 802. Thereafter, the document display process is terminated.

The summary of the process contents in the embodiment has been given above.

Next, a specific example of the process contents in the embodiment will be described in detail.

The contents of the document registration process by the document registration control program 112 are illustrated in FIG. 5. The contents of this process will be described specifically. At Step 600, the text registration program 113 is activated to read the text data of the document to be registered, from the floppy disk 105 which is inserted into the FDD 104, and to store the read text data as the text 107 in the magnetic disk 106. Next, at Step 601, the location information file generation program 114 is activated to extract the predetermined character strings from the text data read at Step 600. As the character strings to be extracted, words are used for a language such as English language in which each word is written in a delimiting manner, and for other languages, character strings obtained by dividing the different character types, consecutive n characters ("n" is a predetermined integer of 1 or larger), words derived with reference to a dictionary and the like, and so forth are used. Furthermore, the location information of each extracted character string is extracted and stored in the magnetic disk 106 as the location information file 108. Although the location information changes with the retrieval method to be used, the location information necessary for the retrieval includes the serial number of the document which contains each character string, the location position thereof, the number of locations thereof and the like. In Related Art 1, the serial number of the document which contains each character string necessary for forming the vector of the document, and the number of locations thereof are used. An example of the process of generating the location information file 108 is illustrated in FIG. 8. The location information file 108 shown in FIG. 8 stores the serial number of the document containing the word extracted by referring to the dictionary or the like, and the number of locations of each word contained in the document. For example, character string "W-Cup" has "2" locations (i.e., appears twice) in the document having the document serial number "1". The document serial number "1" and the location number "2" are therefore stored in the location information file. Lastly, at Step 602, the weight file generation program 115 is activated to calculate the weight of each character string extracted at Step 601 by using the predetermined calculation method, and to store it in the magnetic disk 106 as the weight file 109. Although the calculation method changes with the retrieval method to be used, this weight is calculated by using the location frequency of each character string, the location deviation of each character string in the document database, or the like. The weight calculated from the location deviation is generally the IDF (Inverse Document Frequency) described in "Ranking Algorithms" by Donna Harman, Information Retrieval, pp. 363–392). The IDF is the weight proposed based on the concept that there is the high possibility that a character string contained in many documents is the stop word having the low importance degree. The weight file 109 shown in FIG. 8 stores the weights calculated by using the location deviation. Character string "football" which is contained only in the specific document has the high weight, and character string "next month" contained in many documents like the stop word has the small weight. Thereafter, the document registration process is terminated.

Figure 6:
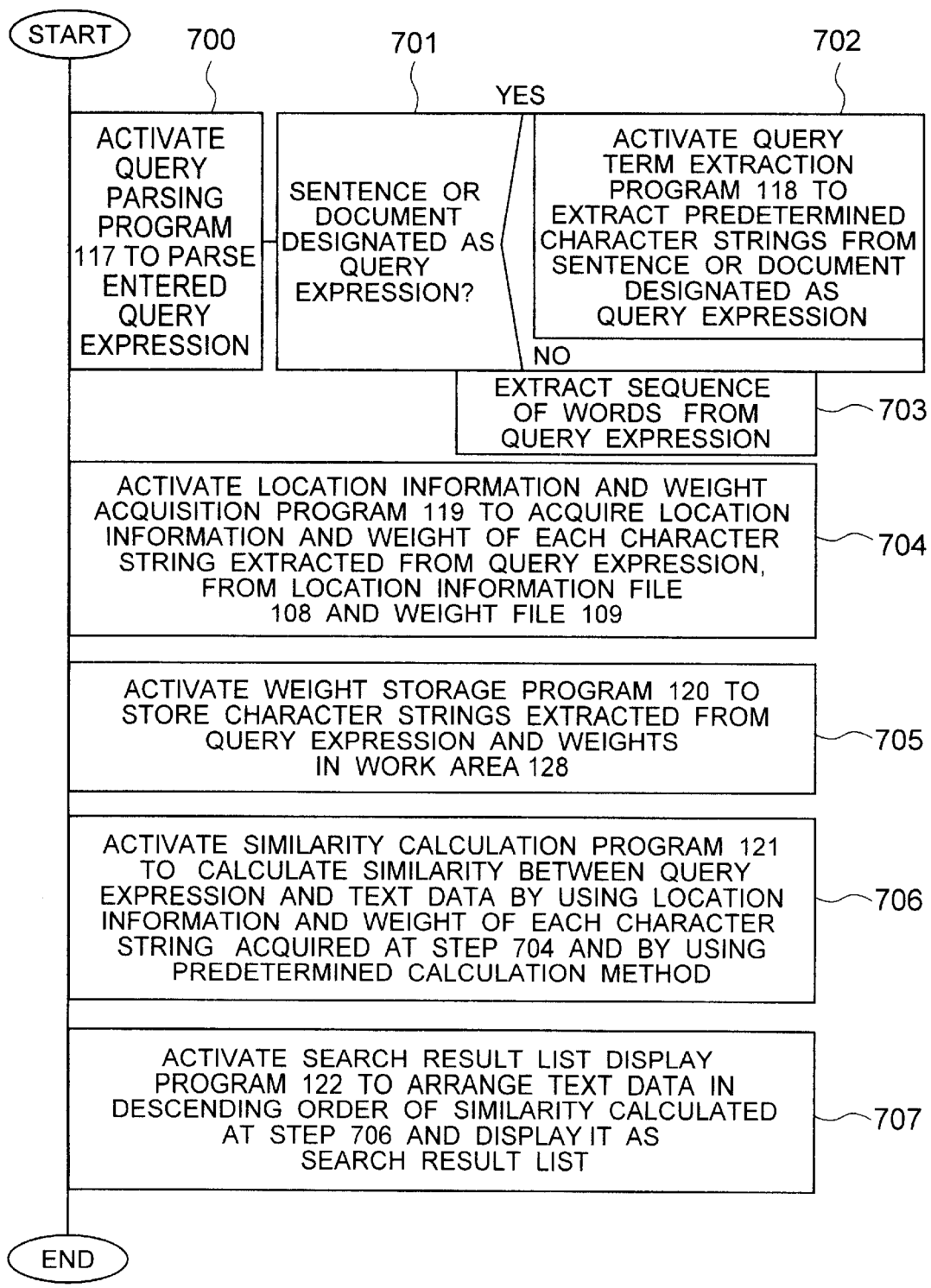
FIG. 6 is a PAD showing the process contents of a document retrieval control program 116.

The contents of the document retrieval process by the document retrieval control program 116 are illustrated in FIG. 6. The contents of this process will be described specifically. At Step 700, the query parsing program 117 is activated to parse the query expression entered from the keyboard 101. If it is judged at Step 701 that a sentence or document is designated as the entered query expression, then at Step 702, the predetermined character strings are extracted from the sentence or document designated as the query expression, by using the query term extraction program 118. As this character string, words are used for a language such as English language in which each word is written in a delimiting manner, and for other languages, character strings obtained by dividing the different character types, consecutive n characters ("n" is a predetermined integer of 1 or larger), words derived with reference to a dictionary and the like, and so forth are used as well as the character strings extracted by the document registration process by the document registration program 112. An example is shown in FIG. 3 when query expression "Football match stadiums for W-Cup will be determined next month, selection right attributed to Association. The organizing arrangement committee for the 2002 football world cup under the joint auspices of Japan and Korea opened on 29-th a governor/mayor meeting by calling special directors from fifteen local self-governing bodies which are candidates for organizing stadiums. For the number of stadiums in Japan, Federation Internationale de Football Association (FIFA) . . . " is designated. In the example shown in FIG. 3, nouns, katakana characters and gerunds are extracted by referring to the dictionary and the like as the character strings used for the retrieval. As a result, "football, W-Cup, match, stadium, next, month, determined, selection, right, Association, Japan; Korea, joint, auspices, world, cup, organizing, arrangement, committee, place, candidates, . . . " is extracted from the query expression. If it is judged at Step 701 that a sequence of words is designated as the entered query expression, then at Step 703, this word sequence is extracted from the query expression. If a logical condition of words, e.g., "searching a document containing both character strings of "football" and "world cup"" such as ""football" [AND] "world cup"" is designated as the query expression, then "foot ball" and "world cup" are extracted as the sequence of words. Next, at Step 704, the location information and weight acquisition program 119 is activated to acquire the location information and the weight of each character string (or word) extracted from the query expression, from the location information file 108 and the weight file 109 read in the work area 128. For example, when the location information and the weight of character string "football" are acquired from the location information file 108 and the weight file 109 shown in FIG. 8, the location information of "3" locations for the document and the weight of "80" are obtained for the document serial number "1". This character string and this weight, e.g., the weight "80" of "football" are stored in the work area 128 by activating the weight storage program 120 at Step 705. Next, at Step 706, the similarity calculation program 121 is activated to calculate the similarity between the query expression and the text data by using the location information and the weight of each character string acquired at Step 704, and by using the predetermined calculation method. Although this calculation method changes with the retrieval method to be used, the simple vector operation used by Related Art 1 may be used for this calculation. Lastly, at Step 707, the search result list display program 122 is activated to arrange the text data in the descending order of the similarity calculated at Step 706 and to display the search result list such as shown in FIG. 3.

It can therefore be understood that the document having the document serial number "123" has the highest similarity to the contents of the designated query expression. Thereafter, the document retrieval process is terminated.

The contents of the document display process by the document display control program 123 are illustrated in FIG. 7. The contents of this process will be described specifically. At Step 800, the query term arrangement program 124 is activated to arrange the character strings and their weights, which are stored in the work area 128 by the document retrieval process of the document retrieval control program 116, in the descending order of the weight. The contents of this arrangement process are illustrated in FIG. 4. With this arrangement process, the character strings are arranged in the descending order of the weight. For example, "W-Cup" and "football" having the weight "80", "world cup" having the weight "70", "FIFA" having the weight "60", "place" having the weight 50, . . . are arranged. Next, at Step 801, the string-for-changing-display-format extraction program 125 is activated to extract the upper m ("m" is a predetermined integer of 1 or larger) character strings of the character strings arranged at Step 800. The value of "m" may be automatically set to the proper value in the system itself, or be set by the user beforehand. Alternatively, the user may set and adjust the value to the proper value interactively each time the document is displayed. In the example shown in FIG. 4, the upper four character strings are extracted, i.e., m=4. As a result, "W-Cup", "football" "world cup" and "FIFA" are extracted as the character strings whose display format is changed. Next, at Step 802, the display format change program 126 is activated to change the display format of the portions, which contain the character strings extracted at Step 801, in the document designated to be displayed (hereinafter called "a selected document to display"). The method of changing the display format is same as Related Art 2. Lastly, at Step 803, the document display program 127 is activated to display the selected document to display in the display format changed at Step 802. The document display example is shown in FIG. 4 with the documents having the document serial numbers "123" and "003". In this example shown in FIG. 4, the display format changed character strings "W-Cup", "football", "world cup" and "FIFA" are displayed with the larger size bold roman fonts. Thereafter, the document display process is terminated.

As described above, in this embodiment, the important character strings are selected from the character strings used in the retrieval to change only the display format of the portions which contain the important character strings.

If the document or the long sentence is designated as the query expression and the retrieved documents are displayed by changing the display format of all character strings used in the retrieval, a number of character strings are changed as shown in FIG. 3. Therefore, there is the problem that the important character strings become difficult to be found. With the method of this embodiment, however, the display format can be changed only for the portions with the high importance.

Thereby, the user can confirm the important portions of the document at once, and can judge quickly whether or not the document is the desired document. The quality of the user interface for browsing the retrieved documents can therefore be improved.

In this embodiment, the display format of the character string having the high weight is changed. Not only the display format is changed, but also the information of the character string having the high weight such as a list of location frequencies may be displayed. It is possible to realize this by the similar processes to those described above.

Although the display format of the character strings is changed to the same display format in this embodiment, it is possible by the same processes described above to change their display formats in accordance with the weights of the character strings. For example, the character string having the highest weight is displayed with the large size and with the loud color. The character string having the next highest weight is displayed only with the large size. In this manner, it is possible to confirm the importance degree of each character string.

Next, a second embodiment of the invention will be described.

In this embodiment, when the character strings for the retrieval which are extracted from the sentence or document designated as the query expression are edited, the user selects the character strings whose display formats are changed in displaying the document (this display format change is hereinafter called "highlighting"). In this embodiment, only the character strings which the user considers to be important are highlighted when the document is displayed. Therefore, the user can confirm the important portions in the document at once, and can quickly judge whether or not the document is the desired document.

Figure 9:
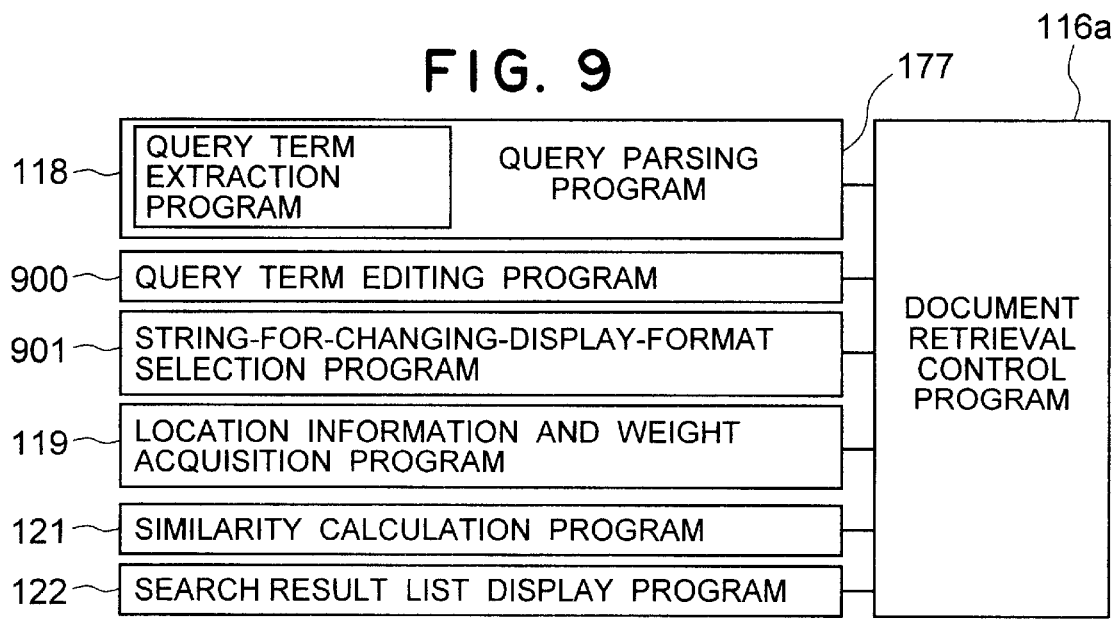
FIG. 9 is a diagram illustrating the contents of programs under the control of a document retrieval control program 116*a* in a second embodiment of the invention.
Figure 10:
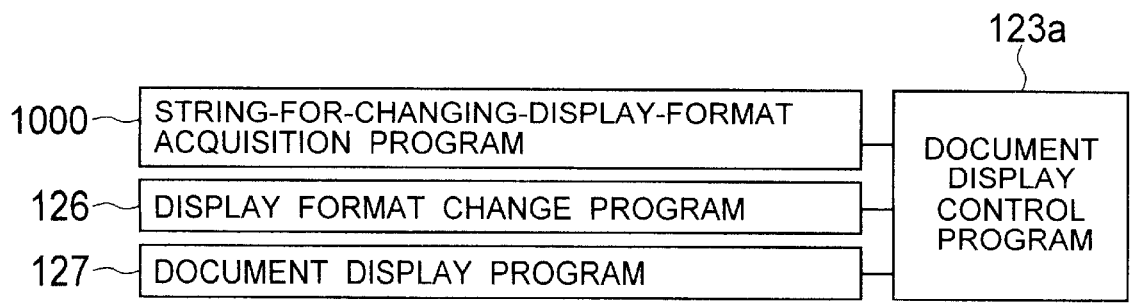
FIG. 10 is a diagram illustrating the contents of programs under the control of a document display control program 123*a* in the second embodiment of the invention.

The second embodiment has fundamentally the same structure as that of the first embodiment (FIG. 1). However, the configurations of the document retrieval control program 116 and the document display control program 123 are different. FIG. 9 shows the structure of programs under the control of a document retrieval control program 116a. FIG. 10 shows the structure of programs under the control of a document display control program 123a. In response to the document retrieval command from the keyboard 101, the system control program 111 activates the document retrieval control program 116a. The document retrieval control program 116a controls the query parsing program 117, a query term editing program 900, a string-for-changing-display-format selection program 901, the location information and weight acquisition program 119, the similarity calculation program 121, and the search result list display program 122. In response to the document display command from the keyboard 101, the system control program 111 activates the document display control program 123a. The document display control program 123a controls a string-for-changing-display-format acquisition program 1000, the display format change program 126 and the document display program 127.

The contents of the document retrieval process by the document retrieval control program 116a and the contents of the document display process by the document display control program 123a which are different from the first embodiment will be described.

In retrieving the document, in response to the document retrieval command from the keyboard 101, the system control program 111 activates the document retrieval control program 116a. The document retrieval control program 116a controls a series of document retrieval processes by using the query parsing program 117, the query term editing program 900, the string-for-changing-display-format the selection program 901, the location information and weight acquisition program 119, the similarity calculation program 121 and the search result list display program 122. For a preparatory process, the document retrieval control program 116s reads the location information file 108 and the weight file 109, which are stored in the magnetic disk 106, into the work area 128 reserved in the main memory 110. In the document retrieval process, as shown in a PAD of FIG. 11, at Step 1100, the query parsing program 117 is activated to parse the query expression entered from the keyboard 101. If it is judged at Step 1101 that a sentence or document is designated as the entered query expression, then at Step 1102, the predetermined character strings are extracted from the sentence or document designated as the query expression, by using the query term extraction program 118. If it is judged at Step 1101 that a sequence of words is designated as the entered query expression, then at Step 1103, this word sequence is extracted from the entered query expression. The above process contents are similar to those of the first embodiment. Next, at Step 1104, the query term editing program 900 is activated to display the character strings extracted from the query expression. The user then adds or deletes the character strings used for the retrieval to the displayed character strings. At Step 1105, the string-for-changing-display-format selection program 901 is activated to make the user select the character strings whose display format is changed when the document is displayed, from the character strings edited at Step 1104. The contents of the selected character strings are stored in the work area 128. Next, at Step 1106, the location information and weight acquisition program 119 is activated to acquire the location information and the weight of each edited character string, from the location information file 108 and the weight file 109 which are read in the work area 128. Next, at Step 1107, the similarity calculation program 121 is activated to calculate the similarity between the query expression and the text data by using the location information and the weight of each character string acquired at Step 1106, and by using the predetermined calculation method. Lastly, at Step 1108, the search result list display program 122 is activated to arrange the text data in the descending order of the similarity calculated at Step 1107 and to display it as a search result list. The process contents from Step 1106 to Step 1108 are similar to the first embodiment. Thereafter, the document retrieval process is terminated.

In displaying the document, in response to the document display command from the keyboard 101, the system control program 111 activates the document display control program 123a. The document display control program 123a controls a series of document display processes by using the string-for-changing-display-format acquisition program 1000, the display format change program 126, and the document display program 127. The contents of the document display process are illustrated in a PAD of FIG. 12. As shown in FIG. 12, at Step 1200, the document display control program 123a activates the string-for-changing-display-format acquisition program 1000 to acquire each character string to be changed its display format, which is stored by the document retrieval process by the document retrieval control program 116a, from the work area 128. Next, at Step 1201, the display format change program 126 is activated to change the display format of portions which contain the character strings extracted at Step 1200 in the document designated to be displayed (hereinafter called "a selected document to display"). The method of changing the display format is same as Related Art 2. Lastly, at Step 1202, the document display program 127 is activated to display the selected document to display in the display format changed at Step 1201. Thereafter, the document display process is terminated.

The summary of the process contents of this embodiment has been given above.

Next, a specific example of the contents of the document retrieval process by the document retrieval control program 116a shown in FIG. 11 and the document display process by the document display control program 123a shown in FIG. 12 will be described in detail.

Figure 11:
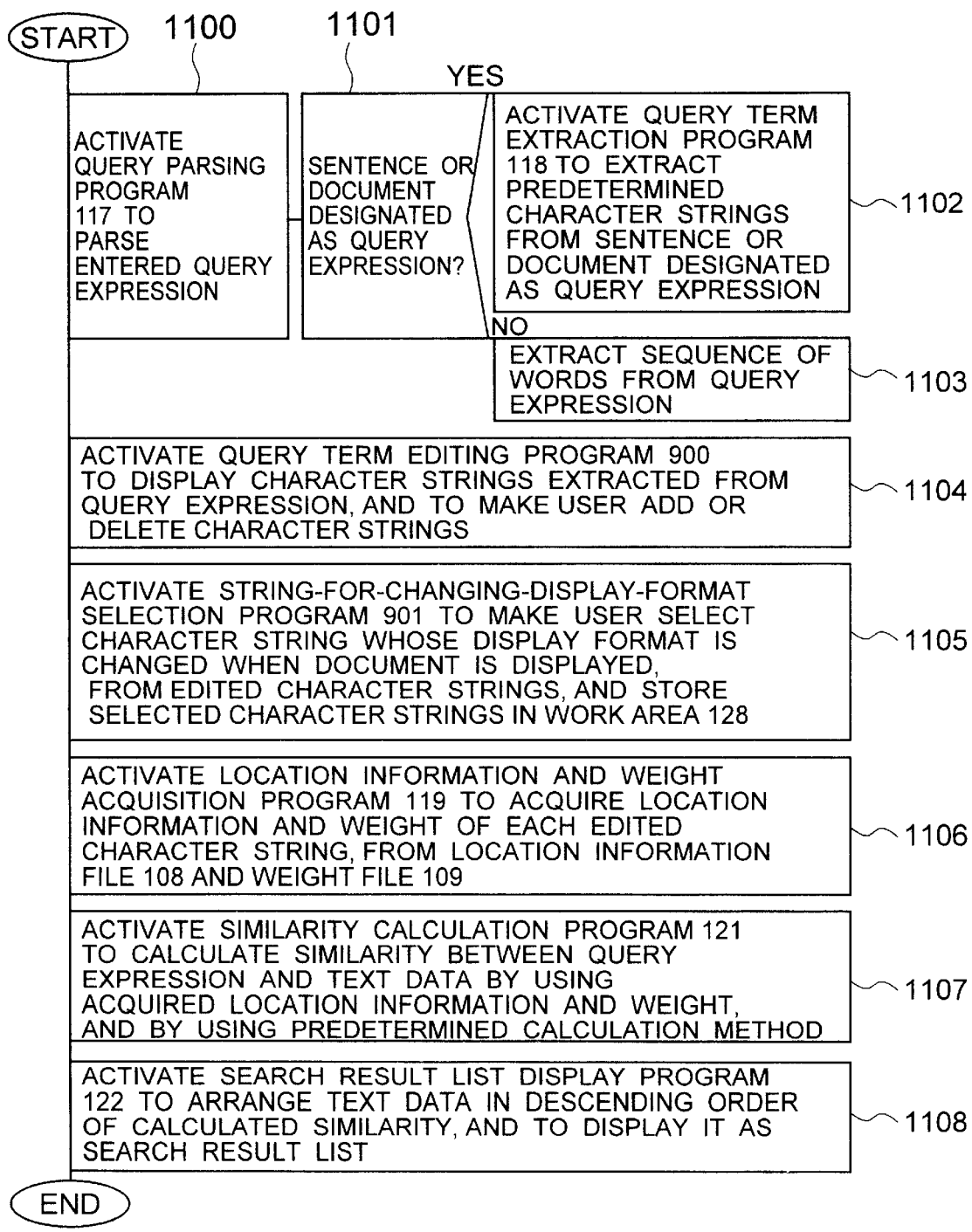
FIG. 11 is a PAD showing the process contents of the document retrieval control program 116*a*.

The contents of the document retrieval process by the document retrieval control program 116a are illustrated in FIG. 11. The contents of this process will be described specifically. At Step 1100, the query parsing program 117 is activated to parse the query expression entered from the keyboard 101. If it is judged at Step 1101 that a sentence or document is designated as the entered query expression, then at Step 1102, the predetermined character strings are extracted from the sentence or document designated as the query expression, by using the query term extraction program 118. If it is judged at Step 1101 that a sequence of words is designated as the entered query expression, then at Step 1103, this word sequence is extracted from the entered query expression. These process contents are similar to the first embodiment. Next, at Step 1104, the query term editing program 900 is activated to display the character strings extracted from the query expression (hereinafter called "query terms"). The user then adds or deletes the character string used for the retrieval to the displayed character strings. At Step 1105, the string-for-changing-display-format selection program 901 is activated to make the user select the character strings whose display formats are changed when the document is displayed (hereinafter called "a selected string to highlight"), from those character strings edited at Step 1104. The contents of the selected character strings are stored in the work area 128. An example of the display screen in the query term editing and the selected-string-to-highlight selection at Steps 1104 and 1105 is illustrated in FIG. 13. In this screen shown in FIG. 13, a list of query terms is displayed. The user selects the character strings used for the retrieval, and turns on a check box displayed as "for retrieval". The character string with the turned-on check box is used for the retrieval, and other character strings are excluded from ones to be retrieved. If a character string different from those displayed query terms is to be used for the retrieval, the user depresses an "add a character string" button, and enters a character string addition command. Thereby, the user adds a character string desired by the user. The selection of the selected string to highlight is realized by turning on a check box displayed as "for display". The character string having the turned-on check box is displayed in the changed display format when the document is displayed. The display format includes color, size, font, style (bold or roman) and the like. After all settings are completed, the user depresses an "execute retrieval" button, and enters a retrieval execution command. In response to this, each character string with the turned-on check box is stored in the work area 128 to execute Steps 1106 to 1108. At Step 1106, the location information and weight acquisition program 119 is activated to acquire the location information and the weight of each edited character string, i.e., the character string with the turned-on check box for retrieval shown in FIG. 13, from the location information file 108 and the weight file 109 which are read in the work area 128. Next, at Step 1107, the similarity calculation program 121 is activated to calculate the similarity between the query expression and the text data by using the location information and the weight of each character string acquired at Step 1106, and by using the predetermined calculation method. Lastly, at Step 1108, the search result list display program 122 is activated to arrange the text data in the descending order of the similarity calculated at Step 1107, and display it as the search result list. The process contents at Steps 1106 to 1108 are similar to the first embodiment. Thereafter, the document retrieval process is terminated.

The contents of the document display process by the document display control program 123*a* are illustrated in FIG. 12. The contents of this process will be described specifically. At Step 1200, the string-for-changing-display-format acquisition program 1000 is activated to acquire from the work area 128 each character string to be changed its display format, which is stored by the document retrieval process of the document retrieval control program 116*a*. In the example of the display screen of the query term editing and the selected-string-to-highlight selection shown in FIG. 13, the user turns on the check boxes for display of "foot ball", "W-Cup", "stadium" and "world cup", so that these character strings are acquired from the work area 128. Next, at Step 1201, the display format change program 126 is activated to change the display format of the portions which contain the character strings acquired at Step 1200 in the document designated to be displayed (hereinafter called "a selected document to display"). The method of changing the display format is same as Related Art 2. Lastly, at Step 1202, the document display program 127 is activated to display the selected document to display in the display format changed at Step 1201. A document display example is shown in FIG. 14 with the documents having the document serial numbers "123" and "003". In this example shown in FIG. 14, the portions which contain "football", "W-Cup", "stadium" and "world cup" are displayed with the larger size bold roman fonts. Thereafter, the document display process is terminated.

As described above, in this embodiment, when the character strings for the retrieval extracted from the sentence or document designated as the query expression are edited, the user selects each character string whose display format is changed in displaying the document, and the display format of only each document portion which contains the selected character string is changed. If a document or a long sentence is designated as the query expression and the retrieved documents are displayed by changing the display format of all character strings for the retrieval, a number of portions are changed as shown in FIG. 3. Therefore, there is a problem that the important portions become difficult to be found. With the embodiment method, however, it is possible to change the display format only for the important character strings selected by the user.

Thereby, the user can confirm the important portion in the document at once, and can judge quickly whether or not the document is the desired document. The quality of the user interface for browsing the retrieved documents can therefore be improved.

In this embodiment, the display format of the character string selected by the user is changed. Not only the display format is changed, but also the information of the character strings selected by the user such as a list of location frequencies may be displayed. This can be realized by the similar processes to those described above.

In this embodiment, the user selects the character string whose display format is changed. The display format of the character string added by the user when the query term is edited can also be changed. This an be realized by the similar processes to those described above. The added character string is considered to be important by the user, so that the important portions in the document can be confirmed at once by changing the display format of this character string in displaying the document.

If the designated query expression is the search result document selected from the previous search result list, the display format of the character string in the query expression used for retrieving the document is changed. This can be realized by the similar processes to those described above. For example, if the retrieval is executed by designating a word and the document retrieval is further executed by using the obtained document, the first designated word is the important work. Therefore, the display format of this word is changed when the document is displayed. In this manner, the important portion of the document can be confirmed at once.

Next, a third embodiment of the invention will be described.

In this embodiment, when a document is displayed, the display format of a character string which greatly contributes to the score of the document is changed (this display format change is hereinafter called "highlighting"). With this method, the user can confirm at once which character strings are used for calculating the score of the document, so that the user can judge at high speed whether or not the document is the desired document.

This embodiment has fundamentally the same structure as that of the first embodiment (FIG. 1). However, the configuration of programs under the control of the document display control program 123 is different. FIG. 15 shows the structure of programs under the control of the document display control program 123*b*. In response to a document display command from the keyboard 101, the system control program 111 activates the document display control program 123*b*. The document display control program 123*b* controls a location information acquisition program 1500, a similarity-every-character-string calculation program 1501, the string-for-changing-display-format extraction program 125, the display format change program 126 and the document display program 127.

The contents of the document display process by the document display control program 123*b* which is different from the first embodiment will be described.

Figure 16:
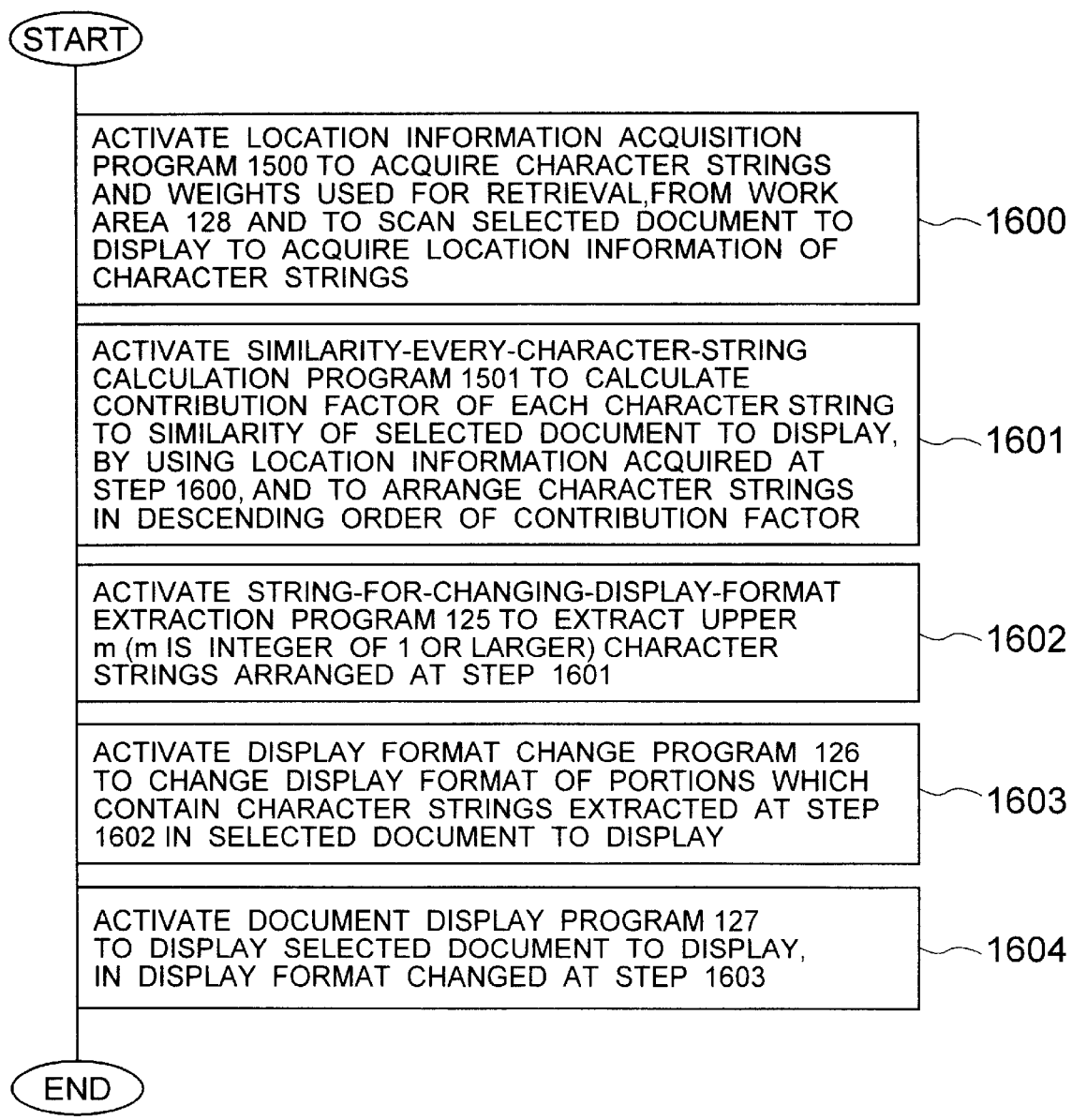
FIG. 16 is a PAD illustrating the process contents of the document display control program 123*b*.

In displaying the document, in response to the document display command from the keyboard 101, the system control program 111 activates the document display control program 123*b*. The document display control program 123*b* controls a series of document display processes by using the location information acquisition program 1500, the similarity-every-character-string calculation program 1501, the string-for-changing-display-format extraction program 125, the display format change program 126 and the document display program 127. The document display process contents are illustrated in a PAD of FIG. 16. As shown in FIG. 16, at Step 1600, the document display control program 123*b* activates the location information acquisition program 1500 to acquire each character string and its weight which are stored in the work area 128, by the document retrieval process of the document retrieval control program 116. The document designated to be displayed (hereinafter called "a selected document to display") is scanned to acquire the location information of each acquired character string in this document. This location information is the same as that extracted by the document registration process of the document registration control program 112.

In Related Art 1, the number of the locations of the character string necessary for generating the vector of the document is extracted (since only the selected document is processed, the document serial number is not necessary as the location information). Next, at Step 1601, the similarity-every-character-string calculation program 1501 is activated to calculate the contribution factor of each character string to the similarity of the selected document to display, by using the location information and the weight which are obtained at step 1601. The character strings are arranged in the descending order of this contribution factor. The similarity of each selected document to display is a value representative of the similarity to the contents of the query expression which is calculated by the document retrieval process of the document retrieval control program 116. Generally, the similarity uses the total sum of the values of each character string calculated by using the location information and the weight and by using the predetermined calculation method. The ratio of the calculated value of each character string to the similarity can be used as the contribution factor. Next, at Step 1602, the string-for-changing-display-format extraction program 125 is activated to extract the upper m ("m" is a predetermined integer of 1 or larger) character strings of the character strings arranged at Step 1601. The value of "m" may be automatically set to the proper value by the system itself, or may be set by the user beforehand. Alternatively, the user may set and adjust the value to the proper value interactively each time the document is displayed. A threshold value of the contribution factor may be set to extract a character string having the contribution factor equal to or larger than the threshold value. Next, at Step 1603, the display format change program 126 is activated to change the display format of portions which contain the character strings extracted at Step 1602 in the selected document to display. The method of changing the display format is same as Related Art 2. Lastly, at Step 1604, the document display program 127 is activated to display the selected document to display in the display format changed at Step 1603. Thereafter, the document display process is terminated.

The summary of the process contents of this embodiment has been given above.

Next, the contents of the document display process of the document display control program 123*b* shown in FIG. 16 will be described in detail using a specific example. At Step 1600, the location information acquisition program 1500 is activated to acquire each character string and its weight which are stored in the work area 128, by the document retrieval process of the document retrieval control program 116.

The selected document to display is then scanned to acquire the location information of the acquired character string in the selected document to display. This location information is the same as that extracted by the document registration process of the document registration control program 112. In Related Art 1, the number of the locations of the character string necessary for generating the vector of the document is extracted (since only the selected document to display is processed, the document serial number is not necessary as the location information). FIG. 17 illustrates an example processed by this process. The character strings used for the retrieval "W-Cup", "football", "stadium", "next month", "determined", . . . and their weights are acquired from the work area 128. By scanning the selected document to display, by using these character strings, the location information is acquired. In this example shown in FIG. 17, the number of the locations in the document is used as the location information. Next, at Step 1601, the similarity-every-character-string calculation program 1501 is activated to calculate the contribution factor of each character string in the document to the similarity. The character strings are arranged in the descending order of the contribution factor. The similarity of the selected document to display is a value representative of the similarity to the contents of the query expression, which is calculated by the document retrieval process of the document retrieval control program 116. Generally, the similarity uses the total sum of the values of each character string calculated by using the location information and the weight, and by using the predetermined calculation method. As a result, the ratio of the calculated value of each character string to the similarity can be used as the contribution factor. In the example shown in FIG. 17, the contribution factor of each character string to the similarity of the selected document to display is calculated from the weights of the character strings "W-Cup", "football", "stadium", "next month", "determined", . . . , and the number of the locations of these character strings in the document. The character strings are arranged in the descending order of the contribution factor to obtain as shown in FIG. 17 the character strings "W-Cup", "football", "stadium", "next month", "determined", . . . . Next, at Step 1602, the string-for-changing-display-format extraction program 125 is activated to extract the upper m ("m" is a predetermined integer of 1 or larger) character strings of the character strings arranged at Step 1601. The value of "m" may be automatically set to the proper value by the system itself, or may be set by the user beforehand. Alternatively, the user may set and adjust the value to the proper value interactively each time the document is displayed. The threshold value of the contribution factor may be set to extract the character string having the contribution factor equal to or larger than the threshold value. An example of this process is illustrated in FIG. 18. In this example shown in FIG. 18, the upper three character strings (i.e., m=3) are extracted. Therefore, "football", "W-Cup" and "stadium" are extracted as the character strings whose display format is changed. Next, at Step 1603, the display format change program 126 is activated to change the display format of the portions which contain the character strings extracted at Step 1602 in the selected document to display. The method of changing the display format is same as Related Art 2. Lastly, at Step 1604, the document display program 127 is activated to display the selected document to display whose display format is changed at Step 1603. In the example of the document with the document serial number "123" shown in FIG. 18, the portions which contain the character strings whose display format is changed, i.e., "football", "W-Cup" and "stadium" are displayed in the large size bold roman fonts. In FIG. 18, the document having the document serial number "003" is also displayed. If the document with the document serial number "003" is designated as the selected document to display, "football", "arrangement" and "next month", are extracted as the upper three character strings having the higher contribution factors to the similarity. The document is displayed by changing the display format of the portions which contain these character strings. Thereafter, the document display process is terminated.

As described above, in this embodiment, when the document is displayed, the character string which greatly contributes to the score of the document is extracted, and the display format of only the portion which contains the extracted character string is changed. If a document or a long sentence is designated as the query expression and the obtained documents are displayed by changing the display 10 format of all character strings used for the retrieval, a number of character strings are changed as shown in FIG. 3. Therefore, there is a problem that the important portions become difficult to be found. With the embodiment method, however, the user can confirm at once which character strings are used for calculating the score of the selected document to display, so that the user can judge at high speed whether or not the document is the desired document. The quality of the user interface for browsing the retrieved document can therefore be improved.

In this embodiment, the display format of the character string which greatly contributes to the score of the document is changed. Not only the display format is changed, but also the information of the character strings which contributes to the calculated score such as a list of the contribution factors may be displayed. This can be realized by the similar processes to those described above. By removing the character string contributing to the score calculation of the document which is not the desired document, from the character strings for the retrieval, it becomes possible to reduce the score of this document and to increase the relative score of the desired document. It is therefore possible to obtain the desired document at high speed.

According to the above-described embodiments, even if a number of the character strings are used for the retrieval, the character strings which affect the factor representative of the similarity to the contents of the query expression are selected, and only the relevant information is displayed. Therefore, the user can confirm the important portions in the document at once, and can quickly judge whether or not the document is the desired document. Even if a document or a long sentence is designated as the query expression to display the obtained documents, the document retrieval system can be realized which has the document display interface easy to judge whether or not the document is the desired document.

As described above, according to the invention, the document retrieval method and system can be realized which is easy to judge whether or not the document is the desired document.

What is claimed is:

1. A document retrieval method for a text database which stores document information as character code data, comprising:
    a document registration step of extracting a predetermined substring and location information of said substring in registration-target text data from said registration-target text data to store said substring and said location information as a location information file;
    a document retrieval step of extracting a predetermined substring from a query expression and extracting a retrieving substring from a part or all of said predetermined substring to calculate a similarity by using location information of said retrieving substring acquired from said location information file and by a predetermined method, said similarity being a degree of similarity between contents of said query expression and contents of a text in said text database; and
    an information-of-important-string display step of selecting an important substring from said extracted retrieving substring based on said calculated similarity to display information of said important substring among information used for calculating said similarity.

2. A document retrieval method according to claim 2, wherein
    said information-of-important-string display step includes:
        a very important string extraction step of calculating a degree of importance of said substring by a predetermined method to extract a predetermined number of substrings in a descending order of said degree of importance; and
        an information-of-very-important-string display step of displaying a contribution factor to the calculation of said location information or said similarity of said substring extracted at said very important string extraction step;
    said important substrings are a predetermined number of substrings extracted in the descending order of the degree of importance at said very important string extraction step; and
    said information of said important substrings includes the contribution factor to the calculation of said location information or said similarity of said important substring.

3. A document retrieval method according to claim 1, wherein
    said document retrieval step includes:
        a string-for-showing-information selection step of extracting predetermined substrings from said query expression to make a user select a substring, information of which is displayed, from said predetermined substrings; and
        a similarity calculation step of calculating a similarity by using said location information of said substrings acquired from said location information file and by a predetermined method, said similarity being a degree of similarity between the contents of said query expression and the contents of said text in said text database;
    said information-of-important-string display step includes:
        a selected string acquisition step of acquiring said substring selected at said string-for-showing-information selection step; and
        a information-of-selected-string display step of displaying a contribution factor to the calculation of said location information or said similarity of said substring extracted at said selected string acquisition step;
    said important substring is said substring selected at said string-for-showing-information selection step; and
    said information of said important substring includes said contribution factor to the calculation of said location information or said similarity of said important substring.

4. A document retrieval method according to claim 1, wherein
    said document retrieval step includes:
        a substring editing step of extracting a predetermined substring from said query expression to add or delete a substring to and from said substring; and
        a similarity-after-editing calculation step of acquiring said location information of said substring edited at said substring editing step from said location information file to calculate a similarity by using said location information and by a predetermined method, said similarity being a degree of similarity between the contents of said query expression and the contents of said text in said text database;

said information-of-important string display step includes:
an additive string acquisition step of acquiring said substring added at said substring editing step; and
an information-of-additive-string display step of displaying a contribution factor to the calculation of said location information or said similarity of said substring acquired at said additive string acquisition step;

said important substring is said substring added at said substring editing step; and said information of said important substring includes the contribution factor to the calculation of said location information or said similarity of said important substring.

5. A document retrieval method according to claim 1, wherein
said information-of-important-string display step includes:
a string-accounting-for-some-of-similarity extraction step of extracting a predetermined number of substrings from said substrings in the order of the contribution to the calculation of said similarity; and
a information-string-accounting-for-some-of-similarity display step of displaying a contribution factor to the calculation of said location information or said similarity of said substring extracted at said string-accounting-for-some-of-similarity extraction step;
said important substrings are a predetermined number of substrings extracted in the order of the contribution to the calculation of said similarity at said string-accounting-for-some-of-similarity extraction step; and
said information of said important substring includes the contribution factor to the calculation of said location information or said similarity of each important substring.

6. A document retrieval method for a text database which stores document information as character code data, comprising:
a document registration step of extracting a predetermined substring and location information of said substring in registration-target text data from said registration-target text data to store said substring and said location information as a location information file;
a document retrieval step of extracting a predetermined substring from a query expression and extracting a retrieving substring from a part or all of said predetermined substring to calculate a similarity by using location information of said retrieving substring acquired from said location information file and by a predetermined method, said similarity being a degree of similarity between contents of said query expression and contents of a text in said text database; and
a document display step of displaying a text designated by a user among texts whose similarities are calculated by said document retrieval step, wherein
said document display step includes a display character format change step of selecting an important substring from said extracted retrieving substring based on said calculated similarity to change a display character format of a portion which contains said important substring in said designated text.

7. A document retrieval method according to claim 6, wherein
said document registration step include:
a location information file generation step of extracting a predetermined substring and said location information of said substring in said registration-target text data from said registration-target text data to store said substring and said location information as said location information file; and
a degree-of-importance file generation step of calculating a degree of importance of said substring by a predetermined method to store said degree of importance as a degree-of-importance file;
said document display step includes:
an important string extraction step of acquiring said degree of importance of said substring from said degree-of-importance file to extract a predetermined number of substrings in a descending order of said acquired degree of importance; and
an important-string display-format change step of changing a display format of a portion which contains said substring extracted at said important string extraction step in said designated text; and
said important string is said predetermined number of substrings extracted in the descending order of said degree of importance at said important string extraction step.

8. A document retrieval method according to claim 6, wherein
said document retrieval step include:
a string-for-changing-display-format selection step of extracting predetermined substrings from said query expression to make a user select a substring, a display format of which is changed, from said predetermined substrings; and
a similarity calculation step of calculating a similarity by using said location information of said substring acquired from said location information file and by a predetermined method, said similarity being a degree of similarity between the contents of said query expression and the contents of said text in said text database;
said document display step includes:
a selected-string acquisition step of acquiring said substring selected by said string-for-changing-display-format selection step; and
a selected-string display-format change step of changing a display format of a portion which contains said substring acquired by said selected-string acquisition step in said designated text; and
said important substring is said substring selected at said string-for-changing-display-format selection step.

9. A document retrieval method according to claim 6, wherein
said document retrieval step includes:
a substring editing step of extracting a predetermined substring from said query expression to add or delete a substring to and from said predetermined substring; and
a similarity-after-editing calculation step of acquiring said location information of said substring edited at said substring editing step from said location information file to calculate a similarity by using said location information and by a predetermined method, said similarity being a degree of similarity between the contents of said query expression and the contents of said text in said text database;

said document display step includes:
an additive-string acquisition step of acquiring said substring added at said substring editing step; and
an additive-string display-format change step of changing a display format of a portion which contains said substring acquired at said additive-string acquisition step in said designated text; and said important substring is said substring added at said additive-string editing step.

10. A document retrieval method according to claim 6, wherein said document display step includes:
a string-accounting-for-some-of-similarity extraction step of extracting a predetermined number of substrings from said substrings in the order of the contribution to the calculation of said similarity; and
a string-accounting-for-some-of-similarity display-format change step of changing a display format of a portion which contains said substring extracted at said string-accounting-for-some-of-similarity extraction step in said designated text; and said important substring is said predetermined number of substrings extracted at said string-accounting-for-some-of-similarity extraction step in the order of the contribution to the calculating of said similarity.

11. A document retrieval system for a text database which stores document information as character code data, comprising:

document registration means for extracting a predetermined substring and location information of said substring in a registration-target text data from said registration-target text data to store said substring and said location information as a location information file;

document retrieval means for extracting a predetermined substring from a query expression and extracting a retrieving substring from a part or all of said predetermined substring to calculating a similarity by using location information of said retrieving substring acquired from said location information file and by a predetermined method, said similarity being a degree of similarity between contents of said query expression and contents of a text in said text database; and document display means for displaying a text designated by a user among texts whose similarities are calculated by said document retrieval means, wherein said document display means includes a display character format change means for selecting an important substring from said extracted retrieving substring based on said calculated similarity to change a display character format of a portion which contains said important substring in said designated text.

12. A storage medium for a text database which stores document information as character code data, and for storing a program for configuring a document retrieval system, comprising:

a document registration module for extracting a predetermined substring and location information of said substring in a registration-target text data from said registration-target text data to store said substring and said location information as a location information file;

a document retrieval module for extracting a predetermined substring from a query expression and extracting a retrieving substring from a part or all of said predetermined substring to calculate a similarity by using location information of said retrieving substring acquired from said location information file and by a predetermined method, said similarity being a degree of similarity between contents of said query expression and contents of a text in said text database; and a document display module for displaying a text designated by a user among texts whose similarities are calculated by said document retrieval module, wherein said document display module includes a display character format change module for selecting an important substring from said extracted retrieving substring based on said calculated similarity to change a display character format of a portion which contains said important substring in said designated text.

* * * * *